United States Patent
Ramotowski et al.

[11] Patent Number: 5,606,329
[45] Date of Patent: Feb. 25, 1997

[54] BUOYANT CABLE ANTENNA

[75] Inventors: Thomas S. Ramotowski, East Lyme; Patrick J. Monahan, Gales Ferry, both of Conn.

[73] Assignee: The United States of America as represented by the Secretary of the Navy, Washington, D.C.

[21] Appl. No.: 605,779

[22] Filed: Feb. 22, 1996

[51] Int. Cl.$^6$ .............. H01Q 1/34; B22C 1/22; B29C 39/26

[52] U.S. Cl. .............. 343/709; 164/6; 164/21; 164/526; 164/527; 264/272.11; 264/DIG. 6

[58] Field of Search ............... 343/709; 164/6, 164/21, 526, 527; 264/272.11, DIG. 6

[56] References Cited

U.S. PATENT DOCUMENTS

| | | | |
|---|---|---|---|
| 2,048,811 | 7/1936 | Peirce | 343/709 |
| 3,272,910 | 9/1966 | Flint | 264/DIG. 6 |
| 3,316,187 | 4/1967 | Grosner et al. | 264/DIG. 6 |
| 3,515,625 | 6/1970 | Sedlak et al. | 264/DIG. 6 |
| 3,972,047 | 7/1976 | Lombardi | 343/709 |

*Primary Examiner*—Hoa Van Le
*Attorney, Agent, or Firm*—Michael J. McGowan; Michael F. Oglo; Prithvi C. Lall

[57] ABSTRACT

A submarine buoyant cable antenna having positive buoyancy comprising a communications antenna electronics package encased in a polymer composition, the polymer composition comprising from about 80 percent to about 85 percent by weight of a room temperature curable thermosetting polymer having a viscosity, before curing, in the range of from about 700 to about 900 centipoise, and from about 15 percent to about 20 percent by weight of microballoons of a size ranging from about 20 to about 100 microns in diameter, the specific gravity of the composition being in the range of from about 0.51 to about 0.65 grams per cubic centimeter to provide the positive buoyancy.

19 Claims, No Drawings

BUOYANT CABLE ANTENNA

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates to a buoyant cable antenna for submarine communication utilizing a flexible polymer composition having a specific gravity sufficient to provide positive buoyancy to the antenna. The invention further relates to a method of making the submarine buoyant cable antenna.

2. Description of the Prior Art

For many years, the U.S. Navy has used a material known as "syntactic foam" to add buoyancy to a number of different devices and underwater vehicles. Syntactic foam is made by mixing glass microballoons into an epoxy matrix. The resulting material is a hard, brittle and lightweight foam that can be cast, but is typically machined, into the final desired shapes. The castings produced in this manner often exhibit density stratifications, a fact which usually results in certain sections of the castings to be cut off and discarded. Contemporary syntactic foams exclusively use a stiff, hard, e.g., epoxy, matrix because it is believed that a rigid matrix is necessary for the foam to survive any significant amount of hydrostatic pressure. This "conventional wisdom" holds that flexible matrices will allow individual microballoons to come into contact with each other under high pressure, and it is feared that such contact will fracture the microballoons and cause the material to lose its buoyancy. These epoxy based matrices being brittle have a tendency to chip or crack.

Additionally, certain foam compositions have been used to provide neutral buoyancy to seismic streamers. A seismic streamer is a linear streaming sonar array towed behind a ship in generally calm subsurface ocean layers. For example, U.S. Pat. Nos. 3,480,907 and 3,900,543 disclose the use of certain foam materials to impart neutral buoyancy to seismic streamers. These foams generally have a specific gravity ranging from 0.72 to 0.85 grams per cubic centimeter.

The prior art does not disclose or suggest a buoyant cable antenna for a submarine using a flexible polymer composition which imparts positive buoyancy to the antenna and which is lightweight and can be bent or coiled without cracking or breaking.

Submarines need to be able to send and receive messages. It has been proposed to maintain radio reception from a submerged submarine through a buoyant cable antenna ("BCA") which rises above the submarine and floats and streams at the ocean surface. When not in use, the BCA is coiled around a small diameter spool in the submarine. The BCA is released to the ocean from a mechanism in the submarine known as a BRA-24. This mechanism exerts substantial force on the BCA when it is released from the submarine to the ocean and returned to the submarine.

The prior art syntactic foams used by the U.S. Navy to provide buoyancy to other devices are not useful in a submarine BCA. Space inside a submarine must be utilized as efficiently as possible. When not in use, the BCA is stored coiled on a spool twelve inches in diameter. The stiff and brittle standard syntactic foams would break is an attempt were made to store a BCA made using them in such a manner. Such a BCA would, in all likelihood, be chipped or otherwise damaged during its passage through the BRA-24 deployment mechanism.

The foams used in the prior art seismic streamers are similarly not useful in a submarine BCA. Seismic streamers trail a floating vessel in generally calm subsurface waters and such conditions differ significantly from a submarine BCA which must rise from the submerged submarine and must be capable of use in all types of sea conditions. Thus, the submarine BCA requires a different and more demanding structure and composition. For example, the submarine BCA is subjected to severe mechanical shocks when towed in high sea conditions, e.g. the BCA must rise from various depths and may be subjected to waves up to 35 feet at the ocean surface. Additionally, the known seismic streamers are made of compositions which provide neutral buoyancy and have a specific gravity in the range of 0.72 to 0.85 grams per cubic centimeter.

SUMMARY OF THE INVENTION

It is, therefore, an object of the invention to provide a submarine buoyant cable antenna utilizing a lightweight, flexible polymer composition which will impart positive buoyancy to the antenna.

It is a further object of the invention to provide a buoyant cable antenna which is flexible and able to withstand bending, coiling and exposure to the severe mechanical shocks of rough sea conditions.

It is another object of the invention to provide a buoyant cable antenna utilizing a polymer and microballoon composition wherein the polymer is a thermosetting polymer having a low viscosity and which is curable at room temperature.

It is another object of the invention to provide a buoyant cable antenna utilizing a polymer mixture before curing and microballoon composition wherein the composition is lightweight and flexible and does not stratify during curing.

It is another object of the invention to provide a method of making a submarine BCA having a polymer and microballoon composition and wherein the polymer mixture before curing has a low viscosity in the range of about 700 to about 900 centipoise and which is workable at room temperature and which will cure at room temperature.

The buoyant cable antenna of the present invention comprises a radio reception electronics package surrounded and sealed by a cured polymer composition having a specific gravity sufficient to provide positive buoyancy and a floating cable connected thereto. The electronics package is approximately 10 to 12 feet in length and 0.6 inches in diameter. The polymer composition comprises a thermosetting polymer having a low viscosity in the range of about 700 centipoise to about 900 centipoise, preferably a two part polyether backbone polyurethane polymer, loaded with from about 15 percent to about 20 percent by weight of glass microballoons and which provides a specific gravity in the range of about 0.51 to about 0.65 per cubic centimeter, preferably about 0.60.

The method for making the submarine BCA comprises preparing a homogenous mixture of a two part thermosetting polymer, preferably a polyether backbone polyurethane polymer, and about 15 percent to about 20 percent glass microballoons, preferably 20 percent, and which provides a specific gravity of about 0.51 to about 0.65 per cubic centimeter, pouring the mixture into a mold containing a radio antenna electronics package, thereby surrounding the electronics package, and allowing the composition to cure at room temperature sealing the electronics package.

DESCRIPTION OF THE PREFERRED EMBODIMENT

The buoyant cable antenna of the invention utilizes a radio antenna electronics package surrounded by a cured polymer and microballoon composition which will enclose and seal the electronics package and provide positive buoyancy to the antenna.

In selecting the polymer for the composition, it is critical that the polymer have: (1) a low initial mixed viscosity in the range of about 700 centipoise to about 900 centipoise; (2) a potlife of at least about 15 to about 40 minutes; (3) resistance to degradation by sea water when cured; (4) flexibility when cured such that the BCA can coil around a small radius spool without tearing or cracking; (5) the ability before curing to remain fluid-like and castable when loaded with up to 20 percent by weight glass microballoons, and (6) a formulation that does not include any mercury compounds. The latter requirement is due to the fact that no mercury containing products can be used or brought aboard U.S. Navy submarines without special permission.

More specifically, the polymer should be a thermosetting polymer which will provide cross-linking and the required structural strength. The polymer must be curable at room temperature because of the size of the complete antenna mold, i.e., about 10 feet to about 12 feet in length and 0.6 inches in diameter. Thus, a room temperature curing polymer is required in order to eliminate the need for a very long oven. It should be noted also that the electronics packages within the BCA may be damaged or degraded by exposure to high temperatures, which is another reason a room temperature curing resin is preferred. Additionally, since the polymer must be loaded with a large number of microballoons, the polymer mixture must be fluid when initially mixed at room temperature. Since the antenna will be stored on a spool inside the submarine, the polymer when cured must be able to provide flexibility in order to withstand the stresses of coiling the BCA and must concurrently provide sufficient strength to withstand severe shocks in the ocean.

The above varying and sometimes competing requirements of the submarine BCA restrict the choices of suitable polymers.

A preferred polymer is a two part polyether backbone polyurethane sold under trade name TC-512 by BJB Enterprises of Garden Grove, Calif. This polymer mixture includes methylene-bis-(-4-cyclohexyl isocyanate), part A, and polyether glycol, part B, which are mixed in a ratio of 67 parts by weight part A and 100 parts by weight part B. The polymer components, when mixed, have a viscosity of 800 centipoise and a potlife of about 35 minutes. The TC-512 polymer which cures at room temperature, is sufficiently fluid when initially mixed to allow it to be loaded with the microballoons and retains its fluidity when loaded with the microballoons such that it can be poured into the antenna mold. The TC-512 polymer contains no mercury. Other polymers which may provide similar attributes include polysulfides, for example Morton International's LP-3, and RTV silicones, for example, Dow Corning's HS II RTV or General Electric's RTV 616. These polymers are also desirable because they exhibit a low initial mixed viscosity, a potlife of at least 15 to 20 minutes and will remain fluid-like and castable even when loaded with microballoons. These desired characteristics preclude stratification of the microballoons in the mixture while it is curing. As a result, the mixture can be cured in the antenna mold without having to cut off any unusable stratified material. Furthermore, the resulting cured polymers display excellent flexibility, tear strength and resistance to saltwater degradation.

Another consideration for the polymer and microballoon composition is the need for it to provide a certain degree of stiffness, while still being flexible to permit coiling, in the antenna. The stiffness is required, among other things, to make deployment of the antenna through the submarine BRA-24 mechanism easier. The BRA-24 includes an opening and the mechanics in the submarine through which the BCA is released and recoiled onto a spool in the submarine. There is a large amount of force generated when releasing and recoiling the BCA.

The stiffness of the foam composition is controlled by adding more or less microballoons to the composition; by increasing the weight fraction of microballoons in the mixture the stiffness is increased. However, if the number of microballoons in the mixture is increased beyond a certain point, the overall material strength will be decreased to an unacceptable level. Further, if the number of microballoons per unit volume is too large, the resultant foam will become weaker and easier to tear since only the polymer matrix contributes to the mechanical strength of the foam composition. While a decrease in density is of limited concern for the floating antenna, a decrease in the material strength can be catastrophic for the BCA which is stored in a coiled arrangement and an inherently weak foam material will have a tendency to spontaneously tear and/or break under such conditions. Further, from the production standpoint, the uncured foam must be of a workable consistency in order to be molded into the desired shape without the introduction of an excessive number of air bubbles.

Thus, a foam containing too large a loading of microballoons will be difficult, if not impossible, to work with in making the antenna.

The microballoons provide the required positive buoyancy to the foam. The microballoons used in the composition can be made of either glass or phenolic plastic, although the phenolic microballoons must be selected to be compatible with the polymer and not react with the polymer. The preferred material is glass. The microballoons useful in the invention range in size from about 20 microns to about 100 microns in diameter. The microballoons must render the foam composition positively buoyant and provide a specific gravity of about 0.51 to about 0.65 grams per cubic centimeter, preferably 0.60 grams per cubic centimeter. It has been found that loading the polymer composition with from about 15 percent by weight to about 20 percent by weight will provide the desired buoyancy and concurrently the structural integrity necessary for the antenna.

The polymer and microballoon composition for the submarine BCA is formed by first mixing the polymer components. In the preferred embodiment, the TC-512 polymer components when mixed exhibit a viscosity of about 800 centipoise. This low viscosity allows the polymer composition to be workable in the subsequent loading and mixture of the microballoons. The polymer is then mixed, before curing, at room temperature with about 15 percent to about 20 percent microballoons by weight, 20 percent being preferred, until the mixture is homogenous. The mixture becomes more viscous but remains workable. The composition is then poured into an open antenna mold containing the electronics package. The composition surrounds the electronics package and is then allowed to cure at room temperature. After curing, the electronics package is sealed within the polymer composition. The exact ratio of polymer to microballoons used in the composition will vary depending on the specific polymer used in the mixture. For example, if a polymer having a high initial density such as when an RTV silicone formulation is used, the percentage of microballoons used in the composition must be increased to maintain the desired specific gravity. However, to preserve the desired flexibility and strength of the final composition, the amount of microballoons added to the polymer should not be greater than 20 percent by weight of the composition. Additionally, if the composition is greater than about 20 percent of microballoons, the resulting mixture will usually be too thick to transfer easily to the curing mold and may weaken the cured composition.

The use of certain plastic microballoons may increase the inherent stiffness of the foam without overloading the polyurethane matrix and thereby weakening the foam. Plastic microballoons are usually lighter than glass microballoons of the same diameter and wall thickness due to the difference in the density of plastic and glass. Accordingly, a given weight of plastic microballoons will generally contain more individual balloons than the same weight of glass microballoons. For example, a sample of polyurethane loaded 20 percent by weight with plastic microballoons will be stiffer and lighter than a sample of the same polyurethane loaded 20 percent by weight with glass microballoons. The greater number of microballoons per unit volume when using plastic microballoons will cause the composite to be somewhat weaker mechanically. It is possible, however, to identify a specific weight loading of plastic microballoons which is of comparable mechanical strength to that of a glass microballoon filled foam, but which still would be somewhat lighter and stiffer. Plastic microballoons identified by the name UCAR Thermoset BJO-950 and available from Union Carbide have been found useful in the present invention.

EXAMPLE

Several BCAs were made and tested in accordance with the teachings of the present invention. Specifically, the TC-512 polymer was made by mixing 67 parts by weight of methylene-bis-(-4-cyclohexyl isocyanate) and 100 parts by weight of the polyglycolether to obtain the polyurethane polymer mixture. To this mixture, 20 percent by weight of glass microballoons having diameters in the range of 20 to 100 microns made by 3M and identified by the name Scotchlite Glass Bubbles were added to the polymer and a homogeneous mixture was formed. The polyurethane and microballoon mixture was poured into one half of the BCA mold first, then the electronics package was pressed into the mixture until it conformed to the shape of the mold. Following this, the other half of the mold was filled with the polyurethane and microballoon mixture and quickly flipped over onto the other half of the mold. The two mold halves were then clamped together to ensure that the finished BCA cured to the proper dimensions. It is noted that some parts of the electronics package were pre-cast into small cylindrical pieces of a different polyurethane with the same outside diameter as the finished BCA. When the ends of the electronics package were tensioned, these pre-cast sections acted as built-in spacers to keep the electronics package centered in the mold. The polymer was allowed to cure for 24 hours. The antenna was removed from the mold and examined, and the electronics package was completely sealed within the polymer composition. The antennas were tested on a submarine over a period of 4 days and found to work well without any cracking or chipping of the polymer composition.

As seen from the description above, the flexible, lightweight polymer and microballoon composition of this invention provides a novel and simple composition and method of making the composition which will impart positive buoyancy to the buoyant cable antenna.

In light of the above, it is therefore understood that within the scope of the following claims, the invention may be practiced otherwise than as specifically described.

What is claimed is:

1. A submarine buoyant cable antenna having positive buoyancy comprising a communications antenna electronics package encased in a polymer composition, said polymer composition comprising from about 80 percent to about 85 percent by weight of a room temperature curable thermosetting polymer having a viscosity, before curing, in the range of from about 700 to about 900 centipoise, and from about 15 percent to about 20 percent by weight of microballoons of a size ranging from about 20 to about 100 microns in diameter, the specific gravity of the composition being in the range of from about 0.51 to about 0.65 grams per cubic centimeter to provide said positive buoyancy.

2. The antenna of claim 1 wherein the polymer is selected from the group consisting of a polyether backbone polyurethanes, polysulfides and RTV silicones.

3. The antenna of claim 1 wherein the microballoons are glass.

4. The antenna of claim 1 wherein the microballoons are phenolic plastic.

5. The antenna of claim 2 wherein the microballoons are glass.

6. The antenna of claim 2 wherein the microballoons are phenolic plastic.

7. The antenna of claim 1 wherein said specific gravity is 0.60 grams per cubic centimeter.

8. A method of making a submarine buoyant cable antenna having positive buoyancy comprising:

mixing the components of a thermosetting polymer curable at room temperature and having a viscosity in the range of about 700 to about 900 centipoise before curing with about 14 percent to about 20 percent by weight of microballoons to obtain a homogeneous mixture and to provide a composition when cured having a specific gravity in the range of about 0.51 to about 0.65 grams per cubic centimeter;

pouring said mixture into an antenna mold to surround a communications electronics package in said mold; and allowing the mixture to cure at room temperature.

9. The method of claim 8 wherein said polymer is selected from a group consisting of polyether backbone polyurethanes, polysulfides and a RTV silicones.

10. The method of claim 8 wherein the microballoons are glass.

11. The method of claim 8 wherein the microballoons are phenolic plastic.

12. The method of claim 8 wherein said specific gravity is 0.60 grams per cubic centimeter.

13. A submarine buoyant cable antenna having a positive buoyancy made by the process of:

mixing the components of a thermosetting polymer curable at room temperature and having a viscosity in the range of about 700 to about 900 centipoise before curing with about 14 percent to about 20 percent by weight of microballoons to obtain a homogeneous mixture and to provide a composition when cured having a specific gravity in the range of about 0.51 to about 0.65 grams per cubic centimeter;

pouring said mixture into an antenna mold to surround a communications electronics package in said mold; and allowing said mixture to cure at room temperature.

14. The antenna of claim 13 wherein the polymer is selected from the group consisting of a polyether backbone polyurethanes, polysulfides and RTV silicones.

15. The antenna of claim 13 wherein the microballoons are glass.

16. The antenna of claim 13 wherein the microballoons are phenolic plastic.

17. The antenna of claim 14 wherein the microballoons are glass.

18. The antenna of claim 14 wherein the microballoons are phenolic plastic.

19. The antenna of claim 13 wherein said specific gravity is 0.60 grams per cubic centimeter.

* * * * *